United States Patent [19]

Jourdain et al.

[11] Patent Number: 4,674,951
[45] Date of Patent: Jun. 23, 1987

[54] RING STRUCTURE AND COMPRESSOR BLOW-OFF ARRANGEMENT COMPRISING SAID RING

[75] Inventors: Gérard E. A. Jourdain, Saintry sur Seine; Marcel R. Soligny, Chevilly-Larue, both of France

[73] Assignee: Societe Nationale D'Etude et de Construction de Meteur D'Aviation (S.N.E.C.M.A.), Paris, France

[21] Appl. No.: 770,247

[22] Filed: Aug. 28, 1985

[30] Foreign Application Priority Data

Sep. 6, 1984 [FR] France ............................ 84 13963

[51] Int. Cl.⁴ .............................................. F04D 27/02
[52] U.S. Cl. ...................................... 415/145; 415/28; 60/39.17
[58] Field of Search ................. 415/144, 145, 22, 28, 415/119, 39, 157; 416/241 A, ; 60/39.17, 39.29

[56] References Cited

U.S. PATENT DOCUMENTS

| | | | |
|---|---|---|---|
| 2,527,732 | 10/1950 | Imbert | 415/145 |
| 3,057,541 | 10/1962 | Hasbrouck et al. | 415/145 |
| 3,296,800 | 1/1967 | Keenan et al. | 415/145 |
| 3,325,997 | 6/1967 | Freeman et al. | 415/145 |
| 3,566,493 | 3/1971 | Poucher et al. | 416/241 A |
| 3,588,268 | 6/1971 | Hampton | 415/145 |
| 3,638,428 | 2/1972 | Shipley et al. | 415/145 |
| 3,647,317 | 3/1972 | Furlong et al. | 416/241 A |
| 3,687,222 | 8/1972 | Camboulives et al. | 415/119 |
| 3,964,257 | 6/1976 | Lardellier | 415/145 |
| 4,240,250 | 12/1980 | Harris | 415/119 |

FOREIGN PATENT DOCUMENTS

| | | |
|---|---|---|
| 1200157 | 12/1959 | France . |
| 1224445 | 6/1960 | France . |
| 1232667 | 10/1960 | France . |
| 2068282 | 8/1971 | France . |
| 2349740 | 11/1979 | France . |
| 911535 | 11/1962 | United Kingdom . |

Primary Examiner—Robert E. Garrett
Assistant Examiner—John Kwon
Attorney, Agent, or Firm—Oblon, Fisher, Spivak, McClelland & Maier

[57] ABSTRACT

A ring of an annular valve assembly is movable in the direction of its longitudinal axis and is intended for an axial compressor blow-off arrangement. The ring takes the form of an axially orientated channel-section member having a first annular skin of concave section nested in a second annular skin also of concave section. A cavity filled with a synthetic resin filler is defined by the two skins. The blow-off arrangement for an axial-flow compressor of a turbo-jet engine, which incorporates this ring, comprises an annular opening with which the ring cooperates to re-form the wall of the air flow when the blow-off arrangement is inoperative.

9 Claims, 2 Drawing Figures

RING STRUCTURE AND COMPRESSOR BLOW-OFF ARRANGEMENT COMPRISING SAID RING

BACKGROUND OF THE INVENTION

1. Field of the Invention

The invention relates to a ring forming part of a valve assembly, which ring is axially movalbe to control the flow of gas for example within a turbo-machine. The invention further relates to a ring controlling a blow-off opening of a compressor gas turbine plant compressor.

2. Summary of the Prior Art

In gas turbine plant, it is known to include in the compressor, valves arranged in line with one or more stages, and intended to blow-off outwardly part of the air flow, when it is required to operate, on partial loading, for example, outside the design range. By this means so-called "surging" is avoided, surging being the consequence of the fluid flows breaking away from the blades which results in instability of flow.

Conventional blow-off means comprise a plurality of valves distributed over the periphery of the casing and synchronously controlled. These valves must have a substantial section, be able to open and close rapidly, and exhibit good fluid-tightness in the closed position so as not to affect adversely the performance of the engine. These requirements lead to heavy, complex arrangements, with far from negligible overall axial dimensions. Moreover, the opening of such valves can create in the main compressor flow a degree of heterogeneity which can disturb the operation of any downstream compressor.

U.S. Pat. No. 3,057,541 describes a ring blow-off valve cooperating with an opening of corresponding shape. This arrangement makes it possible to reduce the overall size and to simplify control; however, the ring illustrated is a simple blade of limited mechanical strength which is subject to vibration and deformation. Moreover, fluid-tightness is inadequate. The ring slides axially on an annular bearing on the outside of the wall without forming in the closed position a smooth outline of the compressor flow path wall, so that the edges of the blow-off openings bring about flow disturbances.

U.S. Pat. No. 3,588,268 partly remedies these defects by proposing a blow-off ring of U-shaped cross-section, and thus less subject to deformation; moreover, the bearings are inclined thereby ensuring better fluid-tightness. However, this ring is not sufficiently rigid, and also the wall exhibits discontinuity at the blow-off openings thus bringing about flow turbulence. FR-A-No. 2 349 740 discloses a ring-shaped valve, slidably mounted so as to control the opening of an annular slit, but this valve is merely a simple blade which, although it has the advantage of substantially reforming the wall of the fluid flow path in the closed position, suffers, nevertheless, from the same drawbacks as U.S. Pat. No. 3,057,541 when it comes to withstanding vibrations and providing adequate fluid-tightness.

An object of the invention is to provide a valve ring for controlling the flow of gas within a turbo-engine, the structure of which ring valve ensures sufficient rigidity to withstand deformation stresses under various operational conditions.

Another object is to provide an annular device for the blow-off of a compressor, provided with this valve ring, so as to obviate the drawbacks of prior proposals.

SUMMARY OF THE INVENTION

According to the present invention there is provided in an axial flow compressor having a casing, a rotor within the casing, rotor blades mounted on the rotor, wall means defining a flow path through the compressor but with a closable annular opening in the outer periphery of the wall means, controllable means for closing by movement axially of the compressor the annular opening which when open provides for blow-off of compressed air through the opening under certain operational conditions, said controllable means comprising an annular channel section member having a first, annular, concave skin or layer, a second, annular, concave skin or layer nested within the first skin to define an annular cavity between the skins, and being secured to the first skin.

Further according to the present invention there is provided in a valve assembly means defining an annular opening, and closure means movable in the direction of the longitudinal axis of the annular opening, said closure means comprising, an annular channel section member build up from a first annular skin of concave section, and a second annular skin of concave section and nested within and rigid with the first skin, the two skins being so shaped as to form an annular cavity.

DESCRIPTION OF THE PREFERRED EMBODIMENT

Figure 1:
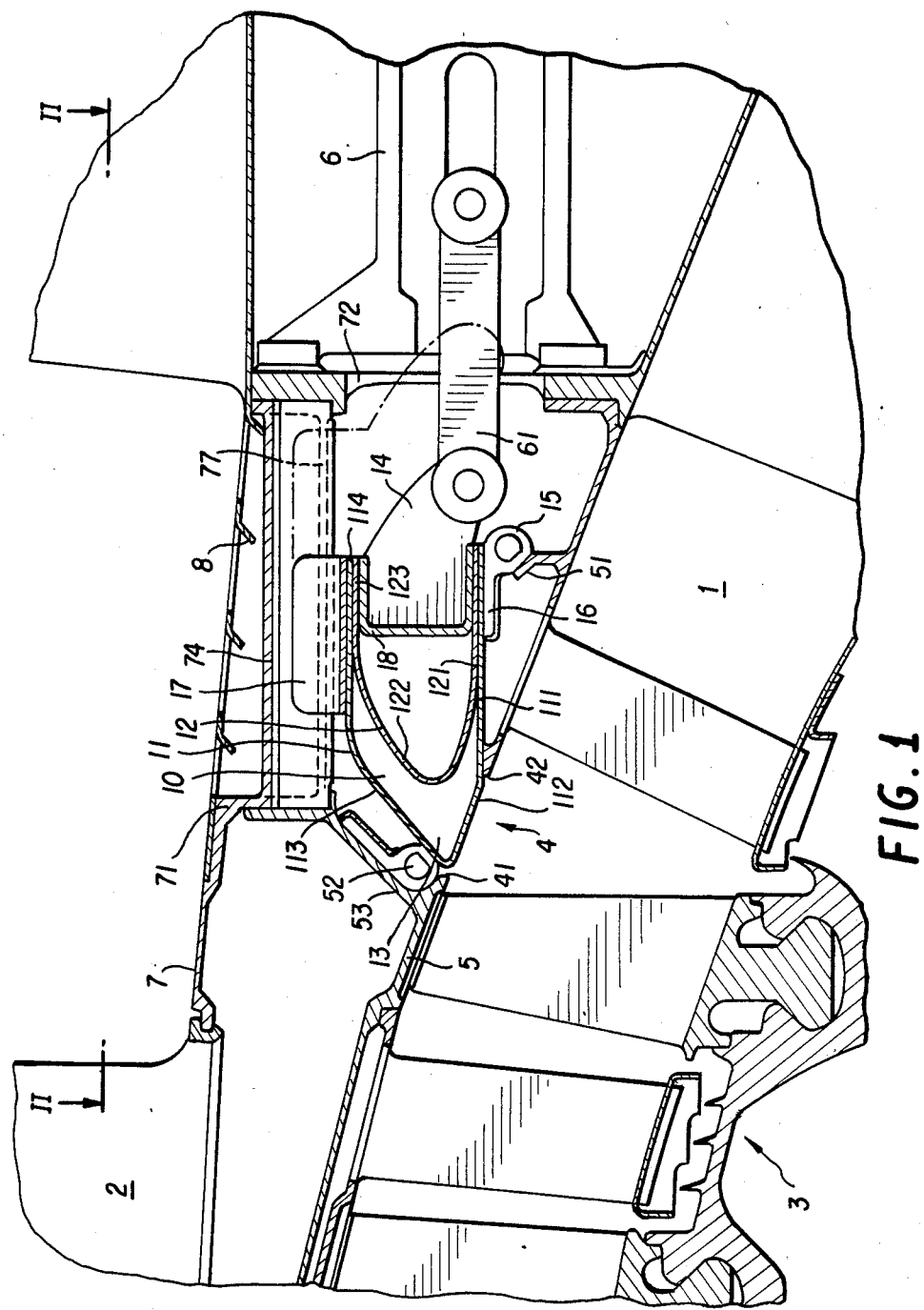
FIG. 1 is a fragmentary longitudinal section of a compressor of a twin flow turbo-jet engine provided with a blow-off ring in accordance with the invention. This Figure corresponds to a section on I—I of FIG. 2.

FIG. 1 is an axial section of a part of the intermediate pressure compressor of a twin flow turbo-jet engine with high by-pass or dilution ratio. The air received from the low pressure compressor (not shown) is divided into a primary flow and a secondary flow. The former passes successively through the medium pressure compressor, the combustion chamber, and the successive turbine stages before being exhausted to atmosphere. The secondary flow, in contrast, is exhausted directly to atmosphere and provides the main part of the thrust.

FIG. 1 indicates a part 1 of the primary flow path, and a part 2 of the secondary flow path. The medium pressure compressor 3 is mechanically independant of the high pressure compressor located downstream. It may happen in certain operational regimes of the engine, when starting for example, that the rotational speeds of the compressors do not match one another, and that the high pressure compressor cannot accommodate the air supplied by the medium pressure compressor. To prevent the so-called "surge" phenomenon, part of the air is blown-off downstream of the medium pressure compressor rotor by opening a ring valve which establishes communication between the primary flow path and the secondary flow path 2.

This valve includes a ring 10 cooperating with an annular opening 4 in the outer wall 5 of the medium pressure compressor, this opening having "parallel" annular edges 41 and 42, each lying in a plane perpendicular to the longitudinal axis of the engine. In the embodiment illustrated, the annular opening corresponds to an imaginary strip of frusto-conical form and lies between the rotor and the flow straightener vanes of the last stage of the medium pressure compressor.

Figure 2:
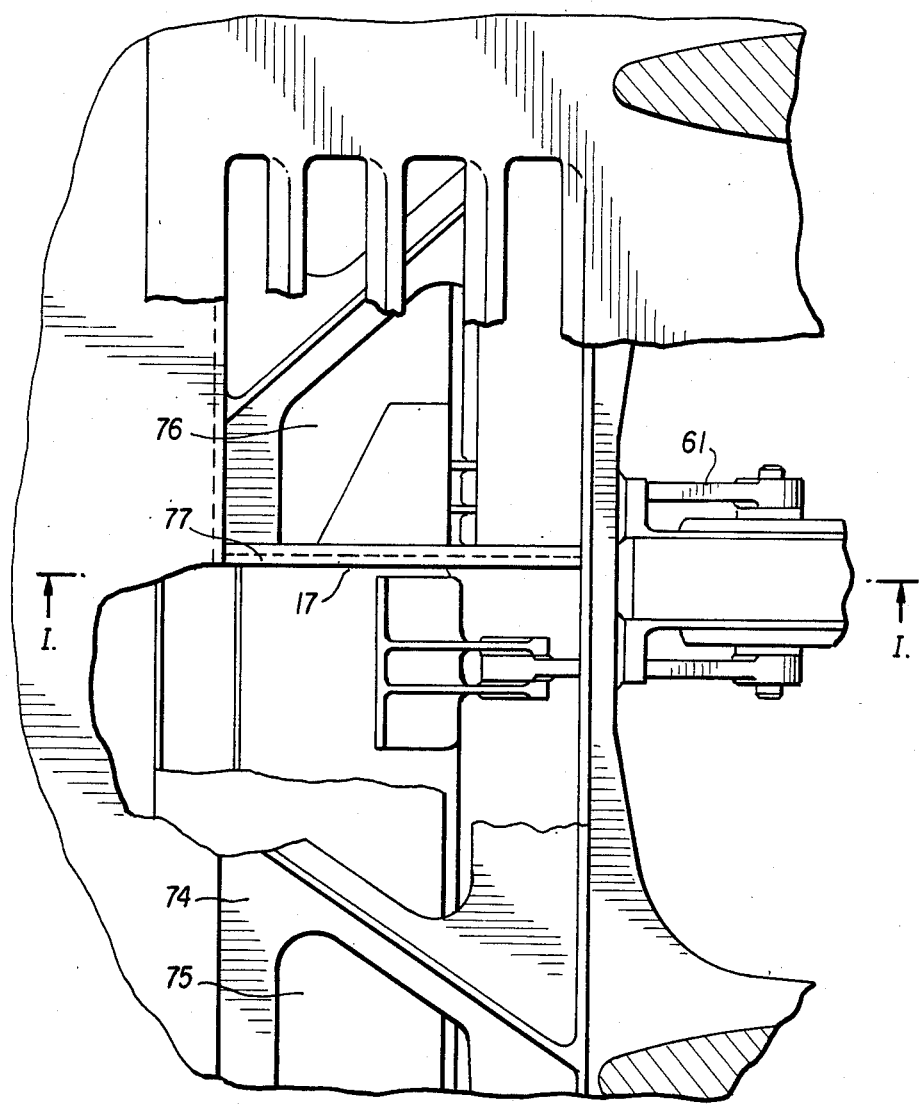
FIG. 2 is a fragmentary development from the plane indicated by arrows II—II of FIG. 1, certain parts being cut away to expose other parts.

The ring 10 is axially movable within a space defined by wall 5 and by the inner wall 7 of the secondary flow path, and, upstream, by a frusto-conical member 53 connecting the wall 5 at the edge 41, with an inwardly-extending radial flange 71 of the wall 7 and, downstream, by a radial flange 72 inter-connecting walls 5 and 7. A hollow cylindrical member 74 is secured respectively upstream and downstream to the radial flanges 71 and 72. The member 74 has cut-away portions, respectively triangular portion 75 and trapezoidal portion 76, as will be seen in FIG. 2, for the passage of the deflected air which passes wall 7 through outflow grids formed by segments peripherally assembled in an annular cut-away portion of the housing forming the wall 7. These segments have annular vanes 8 arranged in "parallel" rows inclined so as to disturb as little as possible the secondary flow by the discharged air.

The ring 10 is in the form of a channel having two sides or limbs. The radial distance between the two sides of the channel thus defines the radial thickness of the ring. The channel is built up of two sheet metal layers as skins 11 and 12, or, preferably, of composite material, of curved section, nested one into the other so as to form a cavity 13 between them. This cavity has a filler providing reinforcement of the ring, for example, a synthetic resin loaded with hollow glass balls. The outer skin 11 has an inner side 111 of cylindrical shape, the diameter of which corresponds to that of an outer seating provided on wall 5 adjacent the edge 42 of the annular opening. The cylindrical side 111 is extended by a frusto-conical part 112, the dimensions of which correspond to the omitted part of wall 5 defining the annular opening 4. A second frusto-conical part 113 is integral with the upstream edge of the part 112 and is extended by a second cylindrical side 114 of the channel concentric with the first side 111 but of larger diameter. The second skin 12 of the channel, the width of which in plane development is less than that of the skin 11, is accommodated within the annular space defined by the skin 11; it has two cylindrical sides 121 and 123, and is secured by any suitable means, for example riveting, adhesives etc with the cylindrical sides 111 and 114. The annular cavity 13 forms a part of this annular space and is defined by the skin 11 and the concave part 122 of the skin 12 connecting the two sides 121 and 123.

The ring 10 is movable within the cylindrical member 74 between a position in which the part 112 blocks the opening 4 and a retracted position unblocking the latter. Means are provided to ensure its centering and guide its movement. In the embodiment illustrated these means are slide members (shoes) 17 evenly-distributed over the outer face of the ring and cooperating with axial guide rails 77 mounted between the flanges 71 and 72. Any other equivalent means would also be suitable: for example, rollers instead of slide members or a slideway formed in the cylindrical member itself, instead of the rails. The ring is driven by a plurality of synchronised axial actuators 6, evenly distributed around the ring, the bodies of which are fixed to the radial flange 72, and the piston rods 61 are pivoted on plates 14 integral with a reinforcement U-section member nested between the sides of the ring. This reinforcement may be limited to sectors only of the ring or be extended to the entirety of the circumference if necessary.

When the ring is in the closing position, fluid-tightness of the primary flow is ensured by two seals. A seal 15 mounted on the inner face of the ring by means of extensions 16 rests on an annular radial flange 51 of the wall 5. A seal 52 housed in the angle defined by the conical member 53 of the supporting structure and the casing forming the wall 5, in line with the edge 41 of the opening 4, also acts as a support at the forward end of the ring.

The operation of the compressor blow-off device will be easily deduced from the foregoing description, however, the mode of operation will, nevertheless, be outlined, as follows:

When the engine runs normally, the ring is pushed back by the actuators 6 so as to come to rest against the seal 52 and the flange 51; in this position the frusto-conical part 112 of the ring substantially reforms the wall of the flow path between the edges 41 and 42 of the annular opening 4. In the retracted, blow-off, position (chain lines) the ring uncovers the opening 4 and enables the deflection of part of the primary air towards the path of the secondary flow where pressure is lower. This air is guided by the frusto-conical part 113 of the ring 10 towards the grids 8 opening in the secondary flow path.

It is possible to envisage other applications for the assembly. For example it may be used as a means of varying the dilution ratio of a twin flow turbo-jet engine, being then disposed in the secondary flow path and associated with a member forming a throat serving to vary the pressure loss inside the channel. It may also be used to ensure the regulation of the ratios of primary and secondary flows by modifying the geometry of the separation edge of the two flows.

What is claimed is:

1. In an axial flow compressor having a casing including wall means defining a gas flow path and blade means in said gas flow path for compressing a gas, means for diverting a portion of said compressed gas from said gas flow path, comprising:
    an annular opening in said wall means;
    means for covering said opening, said means for covering comprising:
    (a) a first annular concave layer having a surface portion shaped to form a continuation of said wall means and being positionable to cover said opening, and
    (b) a second annular concave layer nested within the concavity of said first concave layer, limbs of said first and second concave layers being fixed to one another so as to form a unitary annular channel section member having an annular cavity defined between said first and second annular concave layers; and
    means for moving said channel section member such that said opening is uncovered.

2. A compressor according to claim 1 wherein said layers are made of composite materials.

3. A compressor according to claim 1 wherein the annular opening is of frusto-conical form, and the first layer of the annular channel-section member includes a frusto-conical part conforming to the frusto-conical opening.

4. A compressor according to claim 3, including a further part of the channel-section member comprising means to guide, in the open condition of the opening, air deflected towards the outside of the flow path through the compressor, the said further part being connected to said frusto-conical part.

5. A compressor according to claim 1, comprising first guide means on one face of the annular channel-section member and second guide means fixed to the compressor casing and in sliding engagement with the first guide means.

6. A compressor according to claim 5, wherein the said first guide means are in the form of shoes and said second guide means are in the form of rails.

7. A compressor according to claim 1, including reinforcement means of U-shape cross-section interconnecting the limbs of the channel-section member.

8. The compressor of claim 1, wherein said first annular concave layer includes means for guiding said diverted air from said flow path when said opening is uncovered.

9. In an axial flow compressor having a casing including wall means defining a gas flow path and blade means in said gas flow path for compressing a gas, means for diverting a portion of said compressed gas from said gas flow path, comprising:
an annular opening in said wall means;
means for covering said opening, said means for covering comprising:
  (a) a first annular concave layer having a surface portion shaped to form a continuation of said wall means and being positionable to cover said opening,
  (b) a second annular concave layer nested within the concavity of said first concave layer, limbs of said first and second concave layers being fixed to one another so as to form a unitary annular channel section member having an annular cavity defined between said first and second annular concave layers, and
  (c) a synthetic resin based filler in said cavity;
means for moving said channel section member such that said opening is uncovered; and
reinforcement means of U-shape cross-section interconnecting said limbs of said channel-section member,
wherein said first annular concave layer includes a portion for guiding said diverted air from said flow path when said opening is uncovered.

* * * * *